(12) United States Patent
Slayter et al.

(10) Patent No.: US 11,002,409 B2
(45) Date of Patent: May 11, 2021

(54) GAS AND LIQUID SEPARATION PASSAGE ARRANGEMENT

(71) Applicant: Hamilton Sundstrand Corporation, Charlotte, NC (US)

(72) Inventors: Matthew Allen Slayter, Rockford, IL (US); Jeff A. Brown, Cherry Valley, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 220 days.

(21) Appl. No.: 16/240,830

(22) Filed: Jan. 7, 2019

(65) Prior Publication Data
US 2020/0217453 A1 Jul. 9, 2020

(51) Int. Cl.
F16N 39/00 (2006.01)
B01D 19/00 (2006.01)
B01D 45/14 (2006.01)
F01D 25/20 (2006.01)
F01M 13/04 (2006.01)

(52) U.S. Cl.
CPC ....... F16N 39/002 (2013.01); B01D 19/0031 (2013.01); B01D 45/14 (2013.01); F01D 25/20 (2013.01); F01M 2013/0422 (2013.01); F05D 2260/602 (2013.01); F05D 2260/98 (2013.01)

(58) Field of Classification Search
None
See application file for complete search history.

(56) References Cited

U.S. PATENT DOCUMENTS

| 4,329,159 | A | * | 5/1982 | Bull | B01D 19/0042 204/563 |
|---|---|---|---|---|---|
| 5,526,684 | A | | 6/1996 | Liu et al. | |
| 6,033,450 | A | | 3/2000 | Krul et al. | |
| 7,785,400 | B1 | | 8/2010 | Worley et al. | |
| 8,443,843 | B2 | | 5/2013 | Mount et al. | |
| 8,529,668 | B2 | | 9/2013 | Short et al. | |
| 2004/0025693 | A1 | * | 2/2004 | Bedingfield | B01D 19/0031 95/273 |
| 2008/0110344 | A1 | * | 5/2008 | Follette | B01D 19/0042 96/210 |
| 2008/0179227 | A1 | * | 7/2008 | Saito | B01D 19/0042 210/109 |
| 2009/0120296 | A1 | | 5/2009 | Saito | |

FOREIGN PATENT DOCUMENTS

EP    1614869 A1    1/2006

OTHER PUBLICATIONS

European Search Report for EP Application No. 19212294.3 dated Mar. 25, 2020.

* cited by examiner

Primary Examiner — Jason M Greene
(74) Attorney, Agent, or Firm — Carlson, Gaskey & Olds, P.C.

(57) ABSTRACT

A gas and liquid separation system could be said to have a passage with an inlet connected to receive a mixed gas and liquid flow. An air separation tube extends into the passage at a location downstream of where the inlet is connected with an upstream tube end upstream in the passage relative to a downstream tube end. The upstream tube end provides an obstruction to the mixed gas and liquid flow, to cause separation of the gas from the mixed gas and liquid flow. A liquid tube is connected to the passage at a location downstream of the air separation tube.

7 Claims, 1 Drawing Sheet

GAS AND LIQUID SEPARATION PASSAGE ARRANGEMENT

BACKGROUND

This application relates to a passage structure to separate gas which is entrained in a liquid.

Any number of modern systems utilize liquids for various purposes. As an example, on complex machines, such as gas turbine engines, oil is utilized for any number of applications. The oil can be mixed with air during operation of the engine. It is desirable to separate the air from the oil.

Certain known gas turbine engines have deaerator systems to provide this separation. However, there are also intermediate functions which desirably use the liquid.

SUMMARY

A gas and liquid separation system has a passage with an inlet connected to receive a mixed gas and liquid flow. An air separation tube extends into the passage at a location downstream of where the inlet is connected with an upstream tube end upstream in the passage relative to a downstream tube end. The upstream tube end provides an obstruction to the mixed gas and liquid flow, to cause separation of the gas from the mixed gas and liquid flow. A liquid tube is connected to the passage at a location downstream of the air separation tube.

These and other features may be best understood from the following drawings and specification.

DETAILED DESCRIPTION

Figure 1:
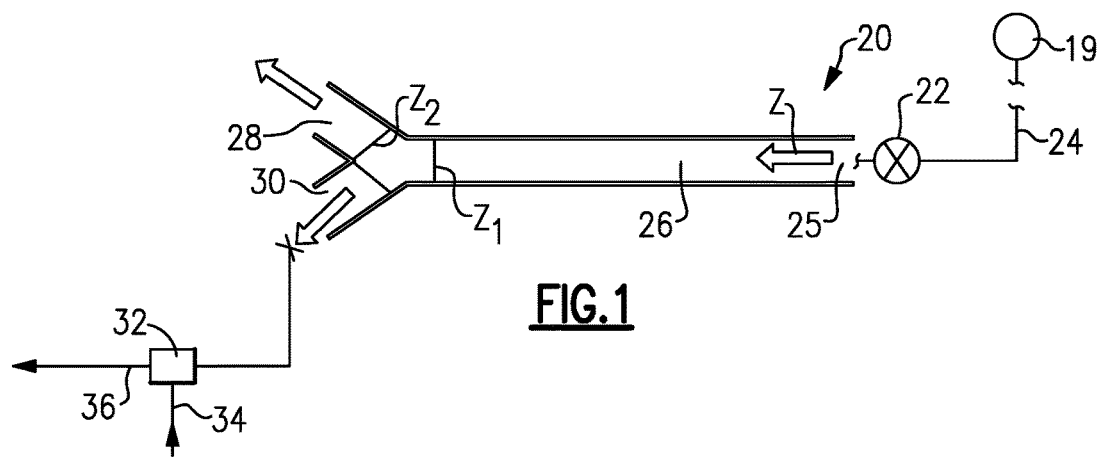
FIG. 1 schematically shows a system.

FIG. 1 shows a system 20, which may be incorporated into a gas turbine engine, among other applications. As shown, a scavenge pump 22 may move oil from a line 24 into a passage 26 through inlet 25. The scavenge pump 22 can be part of a lubrication system 19 (shown schematically) in a gas turbine engine, and is generally operable to return lubricant after it has been used to cool systems on a gas turbine engine back toward an oil storage tank. While a gas turbine engine application is specifically mentioned, oil return systems are known in any number of other applications, and this disclosure would apply to other applications.

There is a good deal of air intermixed and entrained in the oil being returned from line 24. There is an air/oil separation structure in passage 26. As shown, a first flow area $Z_1$ still includes the mixed air and oil.

An air separation tube 28 separates the air and has a second flow area $Z_2$. The liquid, with the bulk of the air removed, passes through a liquid tube 30.

The oil downstream of the liquid tube 30 passes through a venturi 32 at a relatively high pressure to entrain other oil 34 to pass through a downstream use 36. One specific application would be for the venturi to draw oil from an oil tank to provide proper fill to a main lubrication pump if a flow coming from a scavenge system is not adequate to properly fill the main lubrication pump. Other uses might be control systems where air concentration which is too high could raise issues. Examples of such control systems might be hydraulic systems, or lubrication feed systems.

Figure 2:
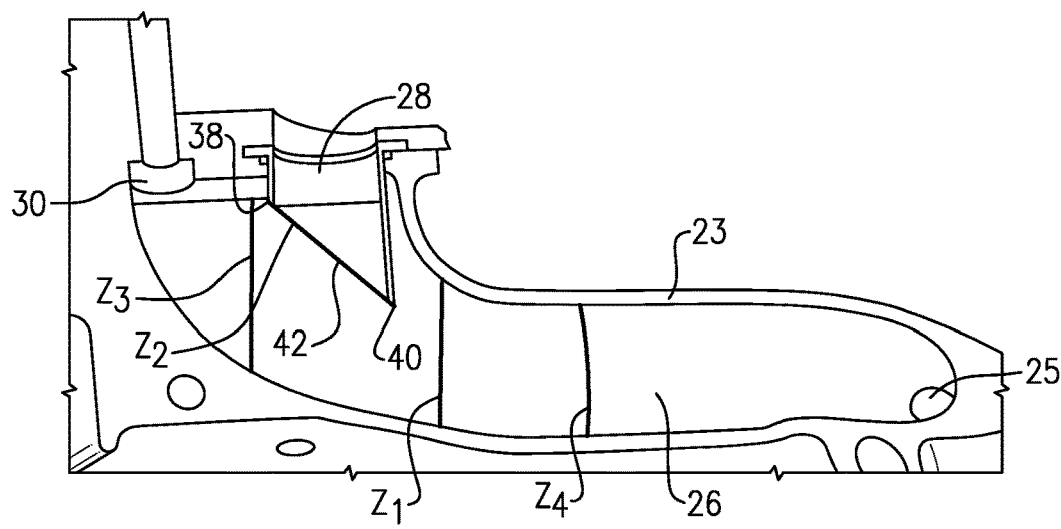
FIG. 2 shows a flow passage for separating air and liquid.

The system 20 is shown less schematically in FIG. 2. A third flow area $Z_3$ is defined downstream of tube 28 and upstream of tube 30. Generally, the passage 26 has a fourth flow area $Z_4$, which is upstream of the area $Z_1$. The area $Z_2$ can be seen to be at end face 42 that provides an opening into the air separation tube 28. The passage 26 is defined in a housing 23. The air separation tube 28 and the liquid tube both also extend to communicate with passage 26 by passing into the housing. Inlet 25 also passes into the housing 23 to communicate with passage 26.

As can be seen, inner face 42 of the tube 28 is angled such that it is not perpendicular to a central axis of the tube. Instead, an upstream end 40 extends further into the passage 26 than does a downstream end 39, with the downstream end 39 being downstream in the passage 26 relative to the upstream end 40. The end face 42 is generally angled between the downstream end 39 and the upstream end 40. The angled end face 42 provides an opening into tube 28.

The area $Z_2$ is defined at that face 42.

As shown, the area $Z_3$ is shown not actually in the liquid tube 30, but in the passage 26 downstream of the tube 28.

Figure 3:
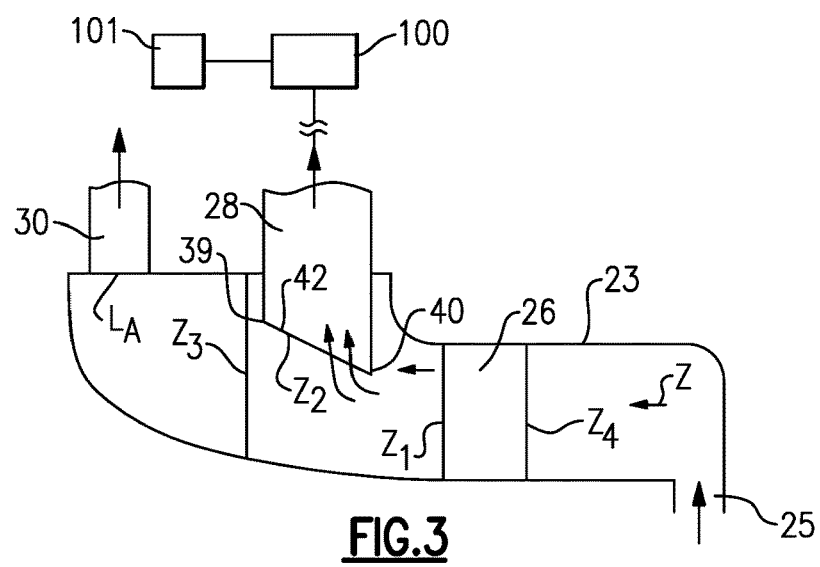
FIG. 3 is a schematic view of the FIG. 2 structure.

The mixed flow of air and liquid in the passage 26 at flow area $Z_1$ hits the forward end 40. As shown in FIG. 3, air tends to flow around this structure while the heavier oil separates outwardly and downwardly.

The separation here is intended to be an intermediate separation to drive the venturi and, thus, downstream of the air in air separation tube 28 moves downstream to a further deaerator 100 function. Downstream of deaerator 100 is a use 101 that that is distinct from use 36.

The separation is not exact and is not perfect. As an example, the airflow moving into air separation tube 28 might be on the order of 50/50% air and oil, whereas the flow into the liquid tube 30 might be on the order of 80/20% oil and air.

One feature of this disclosure is that the flow areas $Z_1$-$Z_4$ are all generally equal to each other. That is, a ratio of the areas $Z_1$:$Z_2$ is between 0.5 and 1.1 and more narrowly between 0.9 and 1.1. A ratio of the areas $Z_2$:$Z_3$ is between 0.9 and 1.1 and a ratio of the area $Z_1$:$Z_3$ is between 0.9 and 1.1.

The area $Z_3$ is taken in the passage downstream of the tube 28, but upstream of when the separated oil will encounter the smaller liquid tube 30. As can be seen, liquid tube 30 has a flow area $L_4$ smaller than $Z_3$. The flow area of the liquid tube 30 is less than 25% of the $Z_1$ area in some embodiments. That is a ratio a liquid tube flow ara $L_4$ to $Z_1$ is less than 0.25.

It can be appreciated from FIGS. 1 and 3, the flow areas $Z_1$, $Z_3$ and $Z_4$ are all defined perpendicularly to a flow direction Z through the passage 26. Of course, in any fluid flow not all of the fluid will move in a linear direction, however, the flow direction Z is defined by the general direction through which the majority of the fluid will flow between the inlet 25 and the cross-sectional $Z_1$.

A gas and liquid separation system could be said to have a passage with an inlet connected to receive a mixed gas and liquid flow. An air separation tube extends into the passage at a location downstream of where the inlet is connected with an upstream tube end upstream in the passage relative to a downstream tube end. The upstream tube end provides an obstruction to the mixed gas and liquid flow, to cause separation of the gas from the mixed gas and liquid flow. A liquid tube is connected at a location to the passage downstream of the air separation tube.

A gas and liquid separation system could also be said to include a housing defining a passage having an inlet connected to receive a mixed gas and liquid flow. A scavenge pump is associated with a lubrication system is connected to provide the mixed liquid and gas flow to the inlet. An air separation tube extends into the housing to communicate with the passage at a location downstream of where said inlet is connected. The air separation tube provides an obstruction to the mixed gas and liquid flow to cause separation of the gas from the mixed gas and liquid flow. A liquid tube is connected to the passage at a location downstream of the air separation tube. The air separation tube has an upstream end extending further into the passage at an upstream end than at a downstream tube end positioned downstream in the passage of the upstream tube end. The air separation tube is connected to an oil return system, and the liquid tube is connected to a venturi pump for providing a driving pressurized fluid through a venturi nozzle.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A gas and liquid separation system comprising:
a passage having an inlet connected to receive a mixed gas and liquid flow;
an air separation tube extending into aid passage at a location downstream of where said inlet is connected with an upstream tube end upstream in said passage relative to a downstream tube end, said upstream tube end to provide an obstruction to the mixed gas and liquid flow, to cause separation of the gas from the mixed gas and liquid flow;
a liquid tube connected to said passage at a location downstream of the air separation tube;
wherein said upstream tube end extending further into the passage than said downstream tube end;
wherein a fluid moving into the air separation tube opening will have a higher gas content than the mixed gas and liquid flow approaching the air separation tube, and a fluid flow entering said liquid tube will have a smaller percentage of gas than the mixed gas and fluid flow approaching the air separation tube;
wherein a first flow area is defined in the passage, upstream of the location where the air separation tube enters the passage a second flow area is defined at said end face of said air separation tube and a ratio of the first flow area to the second flow area is between 0.5 and 1.1;
wherein a third flow area is defined in said passage at a location downstream of said air separation tube and a ratio of said first flow area to said third flow area is between 0.9 and 1.1, and a ratio of said second flow area to said third flow area is between 0.9 and 1.1; and
wherein said liquid tube having a liquid tube flow area, and a ratio of said liquid tube flow area to said first flow area is less than 0.25.

2. The gas and liquid separation system as set forth in claim 1, wherein said air separation tube has an end face angled between the upstream tube end and the downstream tube end, and that provides an opening into the air separation tube.

3. The gas and liquid separation system as set forth in claim 2, wherein a scavenge pump associated with a lubrication system is connected to provide the mixed liquid and gas flow to said inlet.

4. The gas and liquid separation system as set forth in claim 2, wherein the air separation tube is connected to an oil return system.

5. The gas and liquid separation system as set forth in claim 2, wherein the liquid tube is connected to a venturi pump for providing a driving pressurized fluid through a venturi nozzle.

6. The gas and liquid separation system as set forth in claim 2, wherein said ratio of the first flow area to the second flow area is between 0.9 and 1.1.

7. A gas and liquid separation system comprising:
a housing defining a passage having an inlet connected to receive a mixed gas and liquid flow, and wherein a scavenge pump associated with a lubrication system is connected to provide the mixed liquid and gas flow to said inlet;
an air separation tube extending into said housing to communicate with said passage at a location downstream of where said inlet is connected, said air separation tube providing an obstruction to the mixed gas and liquid flow, to cause separation of the gas from the mixed gas and liquid flow;
a liquid tube connected to said passage at a location downstream of the air separation tube;
said air separation tube has an upstream end extending further into the passage at an upstream end than at a downstream tube end, positioned downstream in said passage of said upstream tube end;
the air separation tube is connected to an oil return system, and the liquid tube is connected to a venturi pump for providing a driving pressurized fluid though a venturi nozzle;
wherein said air separation tube has an end face angled between the upstream tube end and the downstream tube end, and that provides an opening into the air separation tube;
wherein a first flow area is defined in the passage, upstream of the location wherein the air separation tube enters the passage, a second flow area is defined at said end face of said air separation tube and a ratio of the first flow area to the second flow area is between 0.9 and 1.1;
wherein a third flow area is defined in said passage at a location downstream of said air separation tube and a ratio of said first flow area to said third flow area is between 0.9 and 1.1, and a ratio of said second flow area to said third flow area is between 0.9 and 1.1; and
wherein said liquid tube having a liquid tube flow area, and a ratio of said liquid tube flow area to said first flow area is less than 0.25.

* * * * *